United States Patent
Matsuyama et al.

(10) Patent No.: US 11,060,730 B2
(45) Date of Patent: Jul. 13, 2021

(54) FUEL INJECTING DEVICE

(71) Applicant: KAWASAKI JUKOGYO KABUSHIKI KAISHA, Kobe (JP)

(72) Inventors: Ryusuke Matsuyama, Osaka (JP); Takeo Nishiura, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 311 days.

(21) Appl. No.: 15/435,670

(22) Filed: Feb. 17, 2017

(65) Prior Publication Data
US 2017/0321901 A1  Nov. 9, 2017

Related U.S. Application Data

(63) Continuation of application No. PCT/JP2015/073022, filed on Aug. 17, 2015.

(30) Foreign Application Priority Data

Aug. 18, 2014 (JP) .............................. JP2014-165803

(51) Int. Cl.
*F23R 3/34* (2006.01)
*F02C 7/232* (2006.01)
(Continued)

(52) U.S. Cl.
CPC .............. *F23R 3/343* (2013.01); *F02C 7/222* (2013.01); *F02C 7/232* (2013.01); *F02C 9/50* (2013.01);
(Continued)

(58) Field of Classification Search
CPC .... F23R 3/30; F23R 3/283; F23R 3/36; F23R 3/60; F23R 3/14; F23R 3/286; F23R 3/343; F02C 7/222; F02C 7/20; F23C 7/004
See application file for complete search history.

(56) References Cited

U.S. PATENT DOCUMENTS 4,198,815 A * 4/1980 Bobo ........................ F23R 3/14
239/403
6,862,888 B2   3/2005 Akagi et al.
(Continued)

FOREIGN PATENT DOCUMENTS

JP    2002-349854 A    12/2002
JP    2007-183094 A    7/2007
(Continued)

OTHER PUBLICATIONS

International Preliminary Report on Patentability and translation of Written Opinion issued from the International Bureau in counterpart International Application No. PCT/JP2015/073022, dated Mar. 2, 2017.
(Continued)

*Primary Examiner* — Gerald L Sung
*Assistant Examiner* — William L Breazeal
(74) *Attorney, Agent, or Firm* — Sughrue Mion, PLLC

(57) ABSTRACT

A fuel injection device for a gas turbine combustor includes a pilot fuel injector disposed on an axis of the fuel injection device; an annular main fuel injector encircling the pilot fuel injector; and a plurality of main fuel injection holes formed in the main fuel injector and spaced circumferentially from each other for injecting fuel axially rearward. The main fuel injector includes an annular fuel passage forming portion, an inner ring portion on an inner peripheral side of the fuel passage forming portion, and an outer ring portion on an outer peripheral side of the fuel passage forming portion. One of a space between the fuel passage forming portion and the inner ring portion and a space between the fuel passage forming portion and the outer ring portion forms a pilot fuel supply passage, and the other one forms a main fuel supply passage.

7 Claims, 3 Drawing Sheets

(51) Int. Cl.
 F23R 3/28    (2006.01)
 F02C 7/22    (2006.01)
 F02C 9/50    (2006.01)
 F23R 3/30    (2006.01)
 F23R 3/50    (2006.01)
 F23D 11/12   (2006.01)
 F23D 11/38   (2006.01)

(52) U.S. Cl.
 CPC .......... *F23R 3/28* (2013.01); *F23R 3/30* (2013.01); *F23R 3/50* (2013.01); *F23D 11/12* (2013.01); *F23D 11/383* (2013.01)

(56) References Cited

U.S. PATENT DOCUMENTS

| | | |
|---|---|---|
| 6,898,926 B2 | 5/2005 | Mancini |
| 7,891,193 B2 | 2/2011 | Hernandez et al. |
| 8,186,163 B2 | 5/2012 | Hernandez et al. |
| 8,935,911 B2 | 1/2015 | Nonaka et al. |
| 2003/0024249 A1 | 2/2003 | Akagi et al. |
| 2004/0148937 A1 | 8/2004 | Mancini |
| 2007/0157616 A1* | 7/2007 | Hernandez ............ F23D 11/36 60/740 |
| 2009/0038312 A1 | 2/2009 | Hernandez et al. |
| 2010/0269506 A1* | 10/2010 | Nonaka ................. F23D 11/386 60/742 |
| 2012/0151928 A1 | 6/2012 | Patel et al. |
| 2013/0291546 A1* | 11/2013 | Cortes .................... F23D 11/24 60/735 |
| 2016/0209037 A1* | 7/2016 | Dai .......................... F23R 3/36 |

FOREIGN PATENT DOCUMENTS

| | | |
|---|---|---|
| JP | 2009-041903 A | 2/2009 |
| JP | 2010-255944 A | 11/2010 |
| JP | 2012-132672 A | 7/2012 |
| JP | 2013-178035 A | 9/2013 |

OTHER PUBLICATIONS

International Search Report of PCT/JP2015/073022 dated Nov. 17, 2015.

* cited by examiner ic application No. PCT/JP2015/073022, filed Aug. 17, 2015, which claims priority to Japanese patent application No. 2014-165803, filed Aug. 18, 2014, the disclosure of which are incorporated by reference in their entirety into this application.

BACKGROUND OF THE INVENTION

Field of the Invention

The present invention relates to a fuel injection device including fuel injectors for use in a combustor of a gas turbine engine.

Description of Related Art

In recent years, in consideration of the environment, there is a need for a reduction of emissions such as NOx (nitrogen oxide) emitted from gas turbine engines. As a fuel injection device for the conventional aircraft gas turbine combustor, a fuel injection device of a diffusive combustion type is generally known. In the diffusion combustion type, since the burning reaction takes place based on the stoichiometric mixture ratio, the flame temperature tends to increase. Considering that the emission of NOx is known to exponentially increase with the increase of the flame temperature, lowering of the flame temperature appears to effectively suppress the emission of NOx. However, in the current situation of the propensity for high temperature and high pressure in the gas turbine engine, further suppression of the emission of NOx with the conventional diffusive combustion method is limited.

In order to lower the flame temperature, a fuel injection device of a lean combustion method is considered effective. The lean combustion method is known to be a method of burning an air-fuel mixture in which the ratio of fuel relative to air is lowered. The lean combustion according to this method contributes to a considerable reduction of the flame temperature as compared with that afforded by the conventional diffusive combustion method. On the other hand, however, the lean combustion method tends to result in an instable and incomplete combustion because of the relatively low flame temperature. In view of this, a concentric-type fuel injection device in which a pilot fuel injector is disposed on an inner side and a main fuel injector is disposed on an outer side so as to be concentric with the pilot fuel injector is used (see, for example, Patent Document 1). This concentric-type fuel injection device realizes a low NOx emission by mainly causing the main fuel injector to perform lean combustion while causing the pilot fuel injector to maintain stable combustion by a diffusion combustion method during a high power operation, and by causing the pilot fuel injector to stabilize a flame by diffusion combustion during a low power operation.

RELATED DOCUMENT

Patent Document

[Patent Document 1] U.S. Pat. No. 6,898,926

SUMMARY OF THE INVENTION

However, in the concentric-type fuel injection device, both of the main fuel injector and the pilot fuel injector are put into operation during the high power operation, but only the pilot fuel injector is put into operation and the main fuel injector is not put into operation during the low power operation. Accordingly, fuel in a fuel pipe of the main fuel injector does not flow during the low power operation in which the main fuel injector is not put into operation. For this reason, coking of fuel remaining in the fuel pipe of the main fuel injector, which may cause clogging of the fuel pipe, sometimes occurs due to heat of high-temperature air flowing around the main fuel injector during the low power operation.

Meanwhile, the fuel injection device disclosed in Patent Document 1, which injects fuel from a main fuel injector toward a radially outer side, is not suitable for use requiring a small-sized fuel injection device because an increase in a dimension in the radial direction is inevitable.

An object of the present invention is to provide a fuel injection device in which coking in a main fuel injector can be effectively prevented while keeping the size of the main fuel injector in a radial direction small in order to solve the above problems.

In order to attain the above object, a fuel injection device according to the present invention is fuel injection device for a combustor of a gas turbine, which includes: a pilot fuel injector disposed on an axis of the fuel injection device; a main fuel injector having an annular shape and disposed so as to be concentric with the pilot fuel injector and encircle an outer periphery of the pilot fuel injector; and a plurality of main fuel injection holes that are formed in the main fuel injector so as to be spaced circumferentially from each other and are configured to inject the fuel axially rearward. The main fuel injector includes a fuel passage forming portion of an annular shape, an inner ring portion located on an inner peripheral side of the fuel passage forming portion, and an outer ring portion located on an outer peripheral side of the fuel passage forming portion. One of a space between the fuel passage forming portion and the inner ring portion and a space between the fuel passage forming portion and the outer ring portion forms a pilot fuel supply passage of an annular shape configured to supply a fuel to the pilot fuel injector, and the other one of the spaces forms a main fuel supply passage of an annular shape configured to supply a fuel to the fuel injection holes of the main fuel injector.

According to this configuration, the dimension of the device in the radial direction is kept small by configuring the main fuel injector as an axial direction injection type. At the same time, the pilot fuel supply passage and the main fuel supply passage are formed by the fuel passage forming portion having an annular shape, the inner ring portion, and the outer ring portion, thereby allowing the main fuel supply passage to be cooled by a fuel flowing through the pilot fuel supply passage in a case where the main fuel supply passage is not used, for example, during a low power operation. Thus, it is possible to effectively prevent coking of the main fuel supply passage with a simple structure.

In one embodiment of the present invention, the pilot fuel supply passage may be located on a radially inner side of the main fuel supply passage. According to this configuration, the structure of the fuel supply passage that is disposed on a radially inner side and supplies a fuel to the pilot fuel injector is simplified.

In one embodiment of the present invention, the fuel injection device may further include: a main housing covering the main fuel injector; and a support ring disposed inside the main housing and having a front end portion that is supported by the main housing and a rear end portion that supports the main fuel injector. According to this configuration, by coupling the main housing and the main fuel injector with a gap interposed therebetween, it is possible to suppress occurrence of stress resulting from a thermal expansion difference in the support ring, which is a support member. Furthermore, since the main fuel injector is circumferentially supported by the main housing via the support ring, which is an annular member, the main fuel injector can be firmly supported even against mechanical vibration.

In one embodiment of the present invention, the fuel injection device may further include: a pilot fuel introducing passage provided on a downstream side of the pilot fuel supply passage and configured to introduce a fuel into the pilot fuel injector; and a pilot housing covering the pilot fuel introducing passage, in which the pilot fuel injector is axially slidably attached to the pilot housing. According to this configuration, it is possible to avoid thermal expansion in a supporting structure for the pilot fuel injector.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
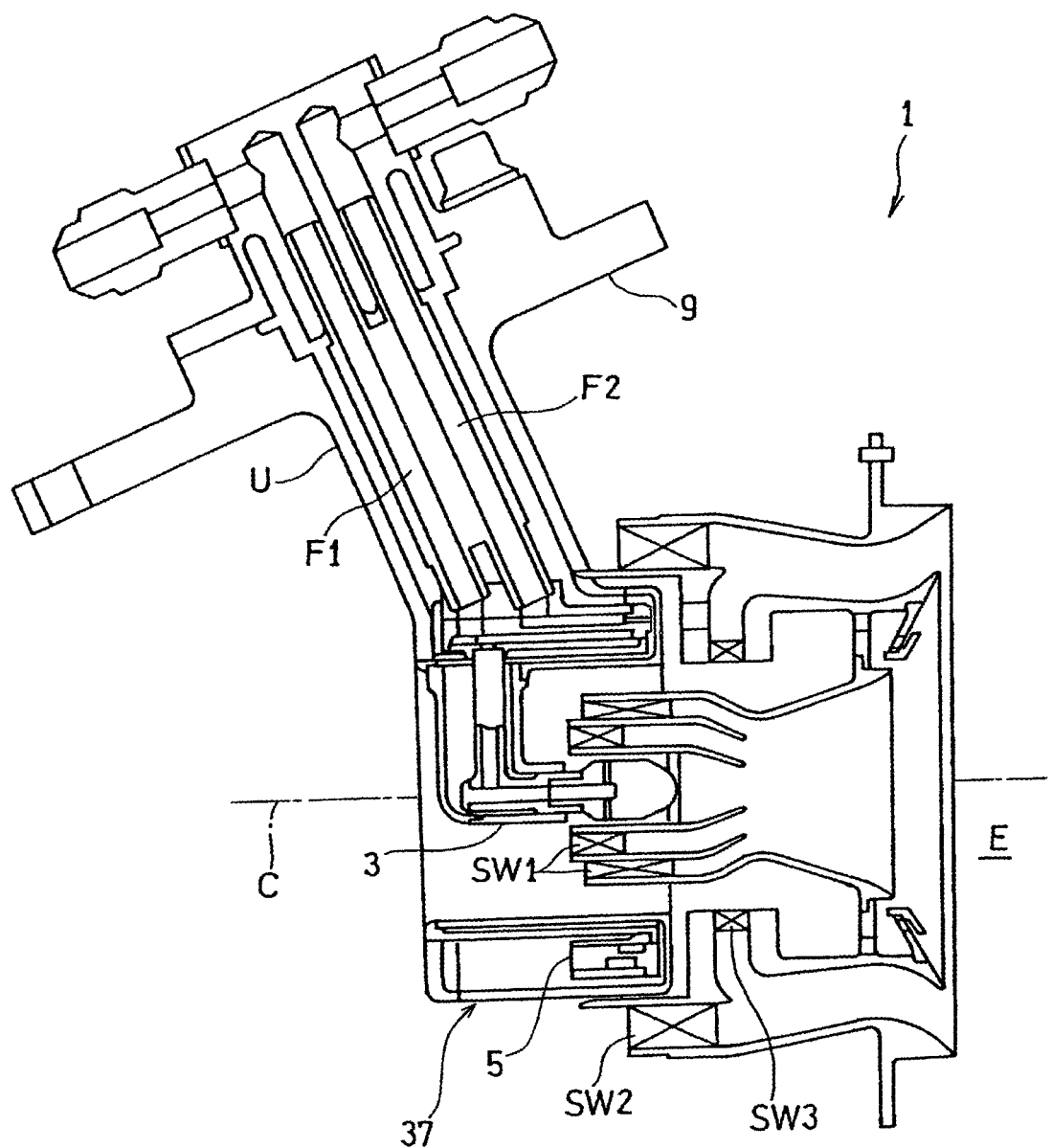
FIG. 1 is a cross-sectional view showing a fuel injection device according to one embodiment of the present invention.

An embodiment of the present invention will be described below with reference to the drawings. FIG. 1 shows a fuel injection device 1 according to an embodiment of the present invention. The fuel injection device 1 is used in a combustor of a gas turbine engine to mix a fuel with a compressed air supplied from a compressor of the gas turbine engine so that the mixture is combusted in a combustion chamber E of the combustor and to supply high-temperature and high-pressure combustion gas generated by the combustion to a turbine so that the turbine is driven. A plurality of fuel injection devices 1 according to the present embodiment are disposed at regular intervals so as to be concentric with an engine rotation axis (not shown). Hereinafter, the combustion chamber E side in a direction of an axis C of the fuel injection device 1 is referred to as a rear side, and a side opposite to the rear side is referred to as a front side. The expressions "rear" and "front" added to names of constituent elements in the embodiments are used in the same meaning. Hereinafter, a direction that is parallel to the axis C of the fuel injection device 1 is simply referred to as an "axial direction".

The fuel injection device 1 includes a pilot fuel injector 3 disposed on the rotation axis C of the fuel injection device 1 and a main fuel injector 5 provided so as to encircle an outer periphery of the pilot fuel injector 3 and be concentric with the axis C of the pilot fuel injector 3. A fuel for diffusion combustion injected from the pilot fuel injector 3 is mixed with an air delivered through a pilot swirler SW1 and is then supplied to the combustion chamber E of the combustor. Meanwhile, a fuel for lean combustion injected from the main fuel injector 5 is premixed with an air passed through a main outer swirler SW2 and a main inner swirler SW3, and is then supplied as a lean mixture gas to the combustion chamber E. Each fuel injection device 1 is supported by a housing (not shown) of the combustor at a stem portion 9 that forms a fuel pipe unit U. The fuel pipe unit U includes a first fuel introducing system F1 for introducing a fuel for diffusion combustion to be supplied to the pilot fuel injector 3 and a second fuel introducing system F2 for introducing a fuel for lean premix combustion to be supplied to the main fuel injector 5.

Figure 2:
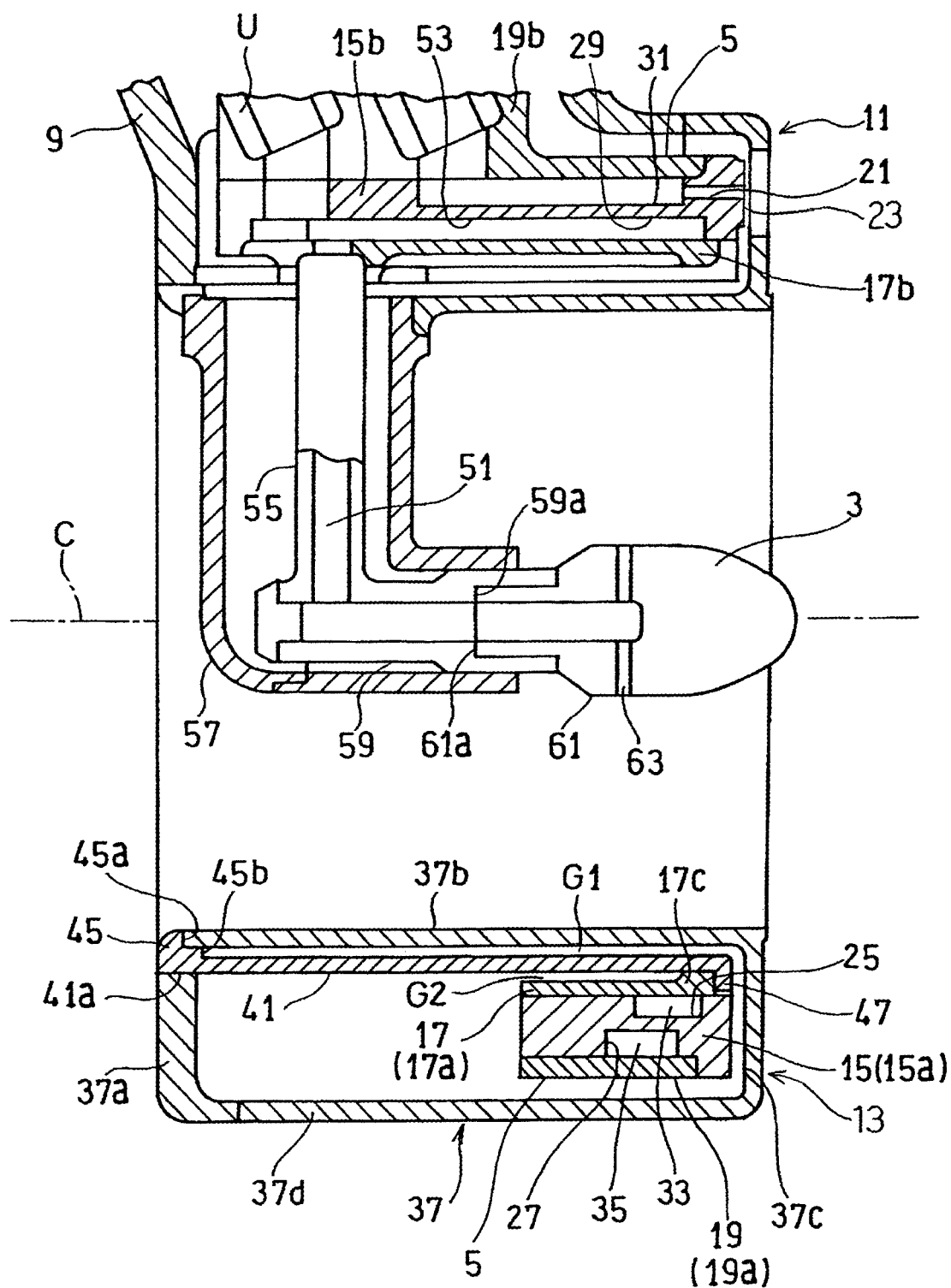
FIG. 2 is an enlarged cross-sectional view showing a portion of the fuel injection device of FIG. 1.

FIG. 2 is an enlarged view showing a structure of a portion of the fuel injection device 1. The fuel injection device 1 includes the pilot fuel injector 3 disposed at a radially center position and the main fuel injector 5 disposed on a radially outer side of the fuel injection device 1, that is, disposed so as to encircle the outer periphery of the pilot fuel injector 3, as described above. The main fuel injector 5 includes a fuel introducing region 11 for introducing fuel into the main fuel injector 5 and an annular fuel flow region 13 for allowing fuel introduced from the fuel introducing region 11 to flow in a circumferential direction of the main fuel injector 5. The fuel introducing region 11 is connected to the fuel pipe unit U.

The main fuel injector 5 includes a fuel passage forming member 15, which forms a fuel passage forming portion of an annular shape, an inner ring 17, which forms an inner ring portion located on an inner peripheral side of the fuel passage forming member 15 (the fuel passage forming portion), and an outer ring 19, which forms an outer ring portion located on an outer peripheral side of the fuel passage forming member 15 (the fuel passage forming portion).

The fuel passage forming member 15 has a fuel passage forming member annular portion 15a that has a cylindrical shape and forms the fuel flow region 13, and a fuel passage forming member base portion 15b that is provided protrudingly from the fuel passage forming member annular portion 15a forward in the axial direction and forms the fuel introducing region 11. The fuel passage forming member 15 has a plurality of through-holes on a rear end surface thereof, which open in the axial direction and are arranged in the circumferential direction. The through-holes function as main fuel injection holes 21 through which a fuel is injected rearward in the axial direction. Each of the main fuel injection holes 21 is provided in a main fuel injection nozzle 23 that protrudes in the axial direction.

The fuel passage forming member annular portion 15a has an inner peripheral surface formed with an inner peripheral side circumferential groove 25 that extends over the entire circumference thereof. The fuel passage forming member annular portion 15a has an outer peripheral surface formed with an outer peripheral side circumferential groove 27 that extends over the entire circumference thereof. The fuel passage forming member base portion 15b has an inner peripheral surface formed with an inner peripheral side axial groove 29 that extends in the axial direction. The fuel passage forming member base portion 15b has an outer peripheral surface formed with an outer peripheral side axial groove 31 that extends in the axial direction.

The inner ring 17 has an inner ring annular portion 17a that forms the fuel flow region 13 and an inner ring introducing portion 17b that is provided protrudingly in the axial direction from the inner ring annular portion 17a and forms the fuel introducing region 11. Similarly, the outer ring 19 has an outer ring annular portion 19a that forms the fuel flow region 13 and an outer ring introducing portion 19b that is provided protrudingly in the axial direction from the outer ring annular portion 19a and forms the fuel introducing region 11.

The inner ring 17 is disposed such that the inner ring annular portion 17a covers the inner peripheral side circumferential groove 25 of the fuel passage forming member 15 and such that the inner ring introducing portion 17b covers the inner peripheral side axial groove 29 of the fuel passage forming member 15. Thus, a space between the fuel passage forming member 15 and the inner ring 17 (i.e., a space in the inner peripheral side circumferential groove 25 and a space in the inner peripheral side axial groove 29) forms a pilot fuel supply passage 33 of an annular shape for supplying a fuel to the pilot fuel injector 3.

Meanwhile, the outer ring 19 is disposed such that the outer ring annular portion 19a covers the outer peripheral side circumferential groove 27 of the fuel passage forming member 15 and such that the outer ring introducing portion 19b covers the outer peripheral side axial groove 31 of the fuel passage forming member 15. Thus, a space between the fuel passage forming member 15 and the outer ring 19 (i.e., a space in the outer peripheral side circumferential groove 27 and a space in the outer peripheral side axial groove 31) forms a main fuel supply passage 35 of an annular shape for supplying a fuel to the main fuel injector 5.

Figure 3:
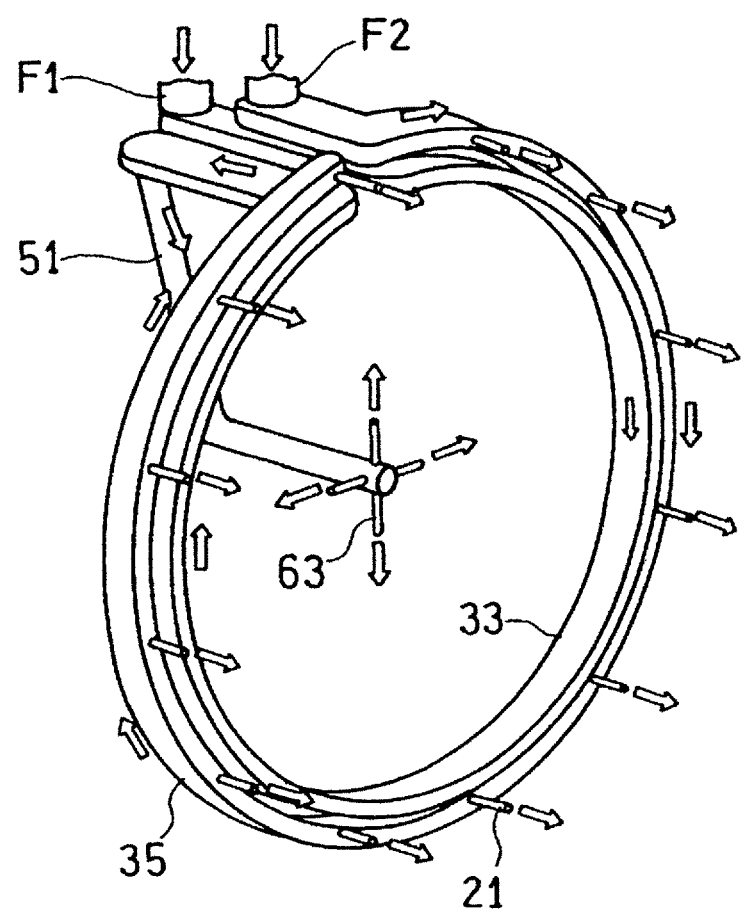
FIG. 3 is a diagram schematically showing a flow passage of fuel in the fuel injection device of FIG. 1.

In the present embodiment, the pilot fuel supply passage 33 is located on a radially inner side of the main fuel supply passage 35 as shown in FIG. 3 in order to simplify the structure of a fuel supply system in consideration of the configuration in which the pilot fuel injector 3 is disposed on a radially inner side of the main fuel injector 5. Alternatively, the space, located on a radially inner side, between the fuel passage forming member 15 and the inner ring 17 may be the main fuel supply passage 35, and the space, located on a radially outer side, between the fuel passage forming member 15 and the outer ring 19 may be the pilot fuel supply passage 33.

As shown in FIG. 2, the fuel injection device 1 further includes a main housing 37 that covers the main fuel injector 5. The main housing 37 supports the main fuel injector 5 via a support ring 41, which will be described later. The main housing 37 insulates heat transfer from ambient high-temperature air to the main fuel injector 5.

The main housing 37 includes a bottom wall portion 37a that forms a front portion of the fuel injection device 1, an inner cylindrical portion 37b that covers a radially inner side of the main fuel injector 5, a rear wall portion 37c that covers a rear portion of the inner cylindrical portion 37b, and an outer cylindrical portion 37d that extends forward from an outer peripheral end of the rear wall portion 37c and covers a radially outer side of the main fuel injector 5. The bottom wall portion 37a is provided integrally with the stem portion 9. The rear wall portion 37c of the main housing 37 has a plurality of injection holes, which are arranged at regular intervals in the circumferential direction at positions respectively corresponding to the main fuel injection nozzles 23, for injecting a fuel supplied from the main fuel injection nozzles 23. The outer cylindrical portion 37d is thinly joined to the bottom wall portion 37a, for example, by welding.

The support ring 41 is in the form of a cylindrical member that has an axial dimension substantially identical with an axial length from a rear end surface of the main fuel injector 5 to a front end surface of the main housing 37. The support ring 41 has a front end portion provided with a front end flange portion 45 of a flange shape that protrudes toward the inner diameter side. In the present embodiment, the front end flange portion 45 has two steps, in which one of the steps that is closer to the rear side has a larger diameter. Meanwhile, the support ring 41 has a rear end portion provided with a rear end flange portion 47 that protrudes toward the outer diameter side.

The support ring 41 configured as above is supported by the main housing 37 at the front end thereof. More specifically, the support ring 41 is supported by the main housing 37 by joining an outer peripheral surface 41a of the front end portion of the support ring 41 to an inner peripheral edge of the bottom wall portion 37a of the main housing 37, for example, by brazing, and fitting the front end portion of the inner cylindrical portion 37b of the main housing 37 to a front side step 45a of the front end flange portion 45 of the support ring 41. A radial gap G1 is present between the support ring 41 and the main housing 37. More specifically, since the front end flange portion 45 of the support ring 41 has the two steps as described above, the radial gap G1 that corresponds to a step height in the radial direction of a rear side step 45b of the front end flange portion 45 is defined between the inner peripheral surface of the support ring 41 and the outer peripheral surface of the inner cylindrical portion of the main housing 37, in a state where the front end portion of the support ring 41 is supported by the main housing 37.

The main fuel injector 5 is supported by a rear end portion of the support ring 41. More specifically, the inner ring 17 of the main fuel injector 5 has a rear end portion fitting onto the rear end flange portion 47 of the support ring 41 from the front side. In the present embodiment, the inner ring 17 has a rear end portion provided with a contact edge 17c that slightly protrudes toward the radially inner side and makes contact with the rear end flange portion 47. Accordingly, the rear end portion of the main fuel injector 5 is supported by the rear end of the support ring 41. In this state, a radial gap G2 is present between the support ring 41 and the main fuel injector 5. More specifically, the radial gap G2 that corresponds to a protruding height of the contact edge 17c is defined between the outer peripheral surface of the support ring 41 and the inner peripheral surface of the main fuel injector 5 (i.e., the inner peripheral surface of the inner ring 17). A portion of the main fuel injector 5 that forms the annular fuel flow region 13 is supported by the main housing 37, only at the rear end portion thereof that is supported by the rear end portion of the support ring 41. In other words, a gap is also defined between an inner wall surface of the main housing 37 and the front end surface, outer peripheral surface, and rear end surface of the main fuel injector 5.

The structure in which the front end portion of the support ring 41 is supported by the main housing 37 is not limited to the example shown in FIG. 2. For example, it is also possible to employ a configuration in which the front end portion of the support ring 41 is made straight instead of providing the front end flange portion 45 and makes radial contact with the bottom wall portion 37a and the inner cylindrical portion 37b of the main housing 37. According to such a configuration, due to slide in the direction of the axis C between the main housing 37 and the support ring 41, occurrence of stress in the direction of the axis C resulting from thermal expansion can be suppressed. Furthermore, the structure in which the support ring 41 supports the main fuel injector 5 is not limited to the example shown in FIG. 2. For example, it is also possible to employ a configuration in which the rear end portion of the support ring 41 fits onto and supports the front end portion or a central portion in the direction of the axis C of the main fuel injector 5 depending on a relative dimensional relationship between the main fuel injector 5 and the support ring 41. The structure in which the support ring 41 supports the main fuel injector 5, i.e., the connection structure between the inner ring 17 and the support ring 41 is not limited to the fitting. For example, the inner ring 17 and the support ring 41 may be fixed by a method such as welding or brazing. The inner ring 17 and the support ring 41 may be formed as a single piece member. Alternatively, the inner ring 17 and the support ring 41 may be in contact with each other so as to be slidable in the direction of the axis C, in which case the support ring 41 supports the main fuel injector 5 in the radial direction.

By thus coupling the main housing 37, which easily reaches a high temperature due to ambient compressed air introduced from a compressor, with the main fuel injector 5, which is cooled by flow of the fuel for the pilot fuel injector 3, such that the main housing 37 and the main fuel injector 5 are spaced from each other, it is possible to suppress occurrence of stress resulting from a thermal expansion difference in the support ring 41, which is a support member. Furthermore, since the main fuel injector 5 is circumferentially supported by the main housing 37 via the support ring 41, which is an annular member, the main fuel injector 5 can be firmly supported even against mechanical vibration.

Since the radial gap G1 is defined between the main housing 37 and the support ring 41 and the radial gap G2 is defined between the support ring 41 and the main fuel injector 5 so that air is present in each gap, heat transfer from the main housing 37, which easily reaches a high temperature, to the main fuel injector 5, especially to the main fuel supply passage 35 can be suppressed. As a result thereof, occurrence of coking in the main fuel supply passage 35 can be suppressed. It is preferable from the perspective of reduction of heat transfer that the gap G2 be present between the support ring 41 and the main fuel injector 5, but the gap G2 may be omitted. That is, it is also possible to employ a configuration in which the support ring 41 and the inner ring 17 of the main fuel injector 5 are in direct contact with each other.

A pilot fuel introducing passage 51 for introducing a fuel into the pilot fuel injector 3 is provided on a downstream side of the pilot fuel supply passage 33. More specifically, the base portion 15b of the fuel passage forming member 15 has an inner peripheral surface formed with an inner peripheral side lead-out groove 53 that extends in parallel to the inner peripheral side axial groove 29. A pilot fuel lead-out pipe 55 that forms the pilot fuel introducing passage 51 is provided so as to extend toward a radially inner side from a downstream end portion of the pilot fuel supply passage 33 formed by the inner peripheral side lead-out groove 53.

The pilot fuel introducing passage 51 (the pilot fuel lead-out pipe 55) is covered with a pilot housing 57. The pilot housing 57 is in the form of a pipe member of substantially L-shape, which corresponds to the shape formed by the pilot fuel introducing passage 51 and the pilot fuel injector 3. The pilot fuel injector 3 is attached to the pilot housing 57 so as to be slidable in the direction of the axis C.

The pilot fuel injector 3 includes a pilot fuel injector support pipe 59 that extends along the axis C and forms a downstream portion of the pilot fuel introducing passage 51, and a pilot fuel injection nozzle 61 that is supported by the pilot fuel injector support pipe 59. The pilot fuel injection nozzle 61 has a pilot fuel injection hole 63 that is communicated with the pilot fuel introducing passage 51 to inject a fuel introduced from the pilot fuel introducing passage 51. The pilot fuel injection nozzle 61 according to the present embodiment has a plurality of (four in the example shown in FIG. 3) fuel injection holes 63 that radially extend in the radial direction, as shown in FIG. 3.

The pilot fuel injector support pipe 59 has, at a downstream side end portion (i.e., a rear end portion) thereof, a fitting recessed portion 59a that is recessed in the axial direction of the support pipe. By fitting a fitting projecting portion 61a provided at an upstream side end portion (i.e., front end portion) of the pilot fuel injection nozzle 61 into the fitting recessed portion 59a of the pilot fuel injector support pipe 59, the pilot fuel injection nozzle 61 and the pilot fuel injector support pipe 59 are coupled with each other.

The external diameter of the downstream side end portion of the pilot fuel injector support pipe 59 is larger than that of other portions of the pilot fuel injector support pipe 59 and is slightly smaller than the inner diameter of the rear end of the pilot housing 57 that covers the downstream side end portion of the pilot fuel injector support pipe 59. In this way, the pilot fuel injector 3 is supported by the main housing 37 via the pilot fuel lead-out pipe 55 and is supported by the pilot housing 57 so as to be slidable in the direction of the axis C.

Since the pilot fuel injector 3 is supported by the pilot housing 57 so as to be slidable in the direction of the axis C, it is possible to avoid thermal expansion in the supporting structure for the pilot fuel injector 3.

As described above, in accordance with the fuel injection device 1 according to the present embodiment, the dimension of the device in the radial direction is kept small by configuring the main fuel injector 5 as an axial direction injection type. At the same time, the pilot fuel supply passage 33 and the main fuel supply passage 35 are formed by the fuel passage forming member 15 having an annular shape, the inner ring 17, and the outer ring 19, thereby allowing the main fuel supply passage 35 to be cooled by fuel flowing through the pilot fuel supply passage 33 when the main fuel supply passage 35 is not used, for example, during a low power operation. That is, it is possible to effectively prevent coking of the main fuel supply passage 35 with a simple structure.

Although the present invention has been fully described in connection with the preferred embodiment thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Fuel injection device
3 . . . Pilot fuel injector

5 . . . Main fuel injector
15 . . . Fuel passage forming member (Fuel passage forming portion)
17 . . . Inner ring (Inner ring portion)
19 . . . Outer ring (Outer ring portion)
21 . . . Main fuel injection hole
33 . . . Pilot fuel supply passage
35 . . . Main fuel supply passage
37 . . . Main housing
41 . . . Support ring

What is claimed is:

1. A fuel injection device for a combustor of a gas turbine, the fuel injection device comprising:
    a pilot fuel injector disposed on an axis of the fuel injection device;
    a main fuel injector having a first annular shape and disposed so as to be concentric with the pilot fuel injector and encircle an outer periphery of the pilot fuel injector;
    a plurality of main fuel injection holes that are formed in the main fuel injector so as to be spaced circumferentially from each other and are configured to inject a first fuel axially rearward; and
    a main housing including an inner cylindrical portion that covers a radially inner side of the main fuel injector, an outer cylindrical portion that covers a radially outer side of the main fuel injector, a bottom wall portion that covers a front side of the main fuel injector, and a rear wall portion that covers a rear side of the main fuel injector;
    the main fuel injector including a fuel passage forming portion of a second annular shape, an inner ring portion located on a radially inner side of the fuel passage forming portion so as to radially confront the fuel passage forming portion, and an outer ring portion located on a radially outer side of the fuel passage forming portion so as to radially confront the fuel passage forming portion,
    wherein each of the plurality of main fuel injection holes is formed as a through-hole that opens axially in a rear end portion of the fuel passage forming portion,
    wherein one of a first space between the fuel passage forming portion and the inner ring portion and a second space between the fuel passage forming portion and the outer ring portion forms a pilot fuel supply passage of a third annular shape configured to supply a second fuel to the pilot fuel injector,
    the other one of the first space and the second space forms a main fuel supply passage of a fourth annular shape configured to supply the first fuel to the plurality of main fuel injection holes of the main fuel injector, and
    wherein the main fuel injector is supported by the main housing only at one end portion of the main fuel injector so that a gap is defined between the main housing and the main fuel injector.

2. The fuel injection device as claimed in claim 1, wherein the pilot fuel supply passage is located on a radially inner side of the main fuel supply passage.

3. The fuel injection device as claimed in claim 1, further comprising:
    a pilot fuel introducing passage provided on a downstream side of the pilot fuel supply passage and configured to introduce the second fuel into the pilot fuel injector; and
    a pilot housing covering the pilot fuel introducing passage,
    wherein the pilot fuel injector is axially slidably attached to the pilot housing.

4. The fuel injection device as claimed in claim 1, wherein the main housing covers an entirety of the radially inner side of the main fuel injector.

5. The fuel injection device as claimed in claim 1, wherein the main housing covers at least a portion of the main fuel injector that confronts the pilot fuel injector.

6. A fuel injection device for a combustor of a gas turbine, the fuel injection device comprising:
    a pilot fuel injector disposed on an axis of the fuel injection device;
    a main fuel injector having a first annular shape and disposed so as to be concentric with the pilot fuel injector and encircle an outer periphery of the pilot fuel injector;
    a plurality of main fuel injection holes that are formed in the main fuel injector so as to be spaced circumferentially from each other and are configured to inject a first fuel axially rearward;
    a main housing including an inner cylindrical portion that covers a radially inner side of the main fuel injector, an outer cylindrical portion that covers a radially outer side of the main fuel injector, a bottom wall portion that covers a front side of the main fuel injector, and a rear wall portion that covers a rear side of the main fuel injector; and
    a support ring disposed inside the main housing and having a support ring front end portion that is supported by the main housing and a support ring rear end portion that supports the main fuel injector,
    the main fuel injector including a fuel passage forming portion of a second annular shape, an inner ring portion located on a radially inner side of the fuel passage forming portion so as to radially confront the fuel passage forming portion, and an outer ring portion located on a radially outer side of the fuel passage forming portion so as to radially confront the fuel passage forming portion,
    wherein each of the plurality of main fuel injection holes is formed as a through-hole that opens axially in a rear end portion of the fuel passage forming portion,
    wherein one of a first space between the fuel passage forming portion and the inner ring portion and a second space between the fuel passage forming portion and the outer ring portion forms a pilot fuel supply passage of a third annular shape configured to supply a second fuel to the pilot fuel injector,
    the other one of the first space and the second space forms a main fuel supply passage of a fourth annular shape configured to supply the first fuel to the plurality of main fuel injection holes of the main fuel injector, and
    wherein the main fuel injector is supported by the main housing via the support ring only at one end portion of the main fuel injector so that a gap is defined between the main housing and the main fuel injector.

7. The fuel injection device as claimed in claim 6, wherein a first radial gap is defined between an inner peripheral surface of the support ring and an outer peripheral surface of the inner cylindrical portion of the main housing,
    wherein a second radial gap is defined between an outer peripheral surface of the support ring and an inner peripheral surface of the inner ring portion, and
    wherein the gap defined between the main housing and the main fuel injector includes the first radial gap and the second radial gap.

* * * * *